United States Patent
Tharumalingam (10) Patent No.: US 8,345,367 B1
(45) Date of Patent: Jan. 1, 2013

(54) RECORDING DEFECTS ON A HARD DRIVE

(75) Inventor: Maheswaran Tharumalingam, Bidor (MY)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 12/977,722

(22) Filed: Dec. 23, 2010

(51) Int. Cl.
G11B 27/36 (2006.01)

(52) U.S. Cl. .......................................... 360/31

(58) Field of Classification Search .............. 360/31, 360/55, 69; 711/112, 162
See application file for complete search history.

(56) References Cited

U.S. PATENT DOCUMENTS

| | | |
|---|---|---|
| 5,146,571 A | 9/1992 | Logan |
| 6,034,831 A | 3/2000 | Dobbek et al. |
| 6,223,303 B1 | 4/2001 | Billings et al. |
| 6,336,202 B1 | 1/2002 | Tsuchimoto et al. |
| 6,384,999 B1 | 5/2002 | Schibilla |
| 6,408,406 B1 | 6/2002 | Parris |
| 6,606,211 B1 | 8/2003 | Lim et al. |
| 6,651,192 B1 | 11/2003 | Viglione et al. |
| 6,691,255 B1 | 2/2004 | Rothberg et al. |
| 6,704,153 B1 | 3/2004 | Rothberg et al. |
| 6,710,958 B2 | 3/2004 | Wyatt |
| 6,854,022 B1 * | 2/2005 | Thelin .............................. 710/5 |
| 6,862,150 B1 | 3/2005 | Eto |
| 6,947,232 B2 | 9/2005 | Lim et al. |
| 6,985,319 B2 | 1/2006 | Yip et al. |
| 7,072,129 B1 | 7/2006 | Cullen et al. |
| 7,236,911 B1 | 6/2007 | Gough et al. |
| 7,269,525 B1 | 9/2007 | Gough et al. |
| 7,603,530 B1 * | 10/2009 | Liikanen et al. ............... 711/162 |
| 7,617,358 B1 * | 11/2009 | Liikanen et al. ............... 711/112 |
| 7,620,772 B1 * | 11/2009 | Liikanen et al. ............... 711/112 |
| 7,653,847 B1 | 1/2010 | Liikanen et al. |
| 7,685,360 B1 | 3/2010 | Brunnett et al. |
| 7,697,388 B2 | 4/2010 | Chiang et al. |
| 7,752,491 B1 * | 7/2010 | Liikanen et al. .............. 714/6.13 |
| 7,916,421 B1 * | 3/2011 | Liikanen et al. ............ 360/77.01 |
| 8,040,625 B1 | 10/2011 | Boyle et al. |
| 8,154,812 B1 | 4/2012 | Boyle et al. |
| 2001/0055172 A1 | 12/2001 | Yip et al. |
| 2002/0191319 A1 | 12/2002 | Liew et al. |
| 2004/0100715 A1 | 5/2004 | Smith et al. |
| 2006/0056088 A1 | 3/2006 | Kudoh et al. |
| 2007/0025005 A1 | 2/2007 | Shimizu |
| 2007/0263313 A1 | 11/2007 | Kitamura et al. |

OTHER PUBLICATIONS

U.S. Appl. No. 12/399,762 to William B. Boyle, et al., filed Mar. 6, 2009, 23 pages.

* cited by examiner

Primary Examiner — Fred Tzeng (57) ABSTRACT

A method for recording defects on a hard drive is provided. The method includes mapping a plurality of primary windows. Each primary window contains a respective plurality of data sectors on a disk of a hard drive. Each of the respective plurality of data sectors contains at least one defect. The method includes recording a location of each primary window in a defect log of the disk, and mapping a plurality of secondary windows if recording the location of each primary window fails. Each secondary window contains a respective plurality of data sectors containing at least one defect. The number of data sectors contained in each of the plurality of primary windows is different from the number of data sectors contained in each of the plurality of secondary windows. The method includes recording a location of each secondary window in the defect log of the disk.

17 Claims, 8 Drawing Sheets

RECORDING DEFECTS ON A HARD DRIVE

FIELD

The present invention generally relates to hard drive manufacturing, and in particular, relates to the recording of defects on hard drives.

BACKGROUND

In the manufacture of a hard drive, data sectors on a disk of the hard drive may be scanned for defects. These defects may be recorded as entries in a defect log stored on the disk. The entries in the defect log may provide an indication of which data sectors are defects and therefore may not be used for storage. If the defect log becomes full from recording the defects, then the entire disk is considered a failure and not suitable for use. However, the disk may have remaining data sectors that have not been scanned for defects but are otherwise suitable for use. It would therefore be advantageous to salvage these remaining data sectors for use.

SUMMARY

A method for recording defects on a hard drive is provided. The method includes mapping a plurality of primary windows. Each primary window contains a respective plurality of data sectors on a disk of a hard drive. Each of the respective plurality of data sectors contains at least one defect. The method includes recording a location of each primary window in a defect log of the disk, and mapping a plurality of secondary windows if recording the location of each primary window fails. Each secondary window contains a respective plurality of data sectors containing at least one defect. The number of data sectors contained in each of the plurality of primary windows is different from the number of data sectors contained in each of the plurality of secondary windows. The method includes recording a location of each secondary window in the defect log of the disk.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, to one ordinarily skilled in the art that the subject technology may be practiced without some of these specific details. In certain instances, well-known structures and techniques have not been shown in detail so as not to obscure the subject technology.

When data sectors on a disk of a hard drive are scanned for defects, windows are used to map the defects and their surrounding data sectors. The locations of these windows may then be recorded as entries in a defect log stored on the disk to ensure that the defects are not accidentally written to and/or read from. Thus, data sectors that are covered by the windows are not used for storage. These windows may be defined based on parameters that specify a size for each window. For example, the size of a window may be identified by a number of tracks and a number of wedges of the disk covered by the window.

Figure 1:
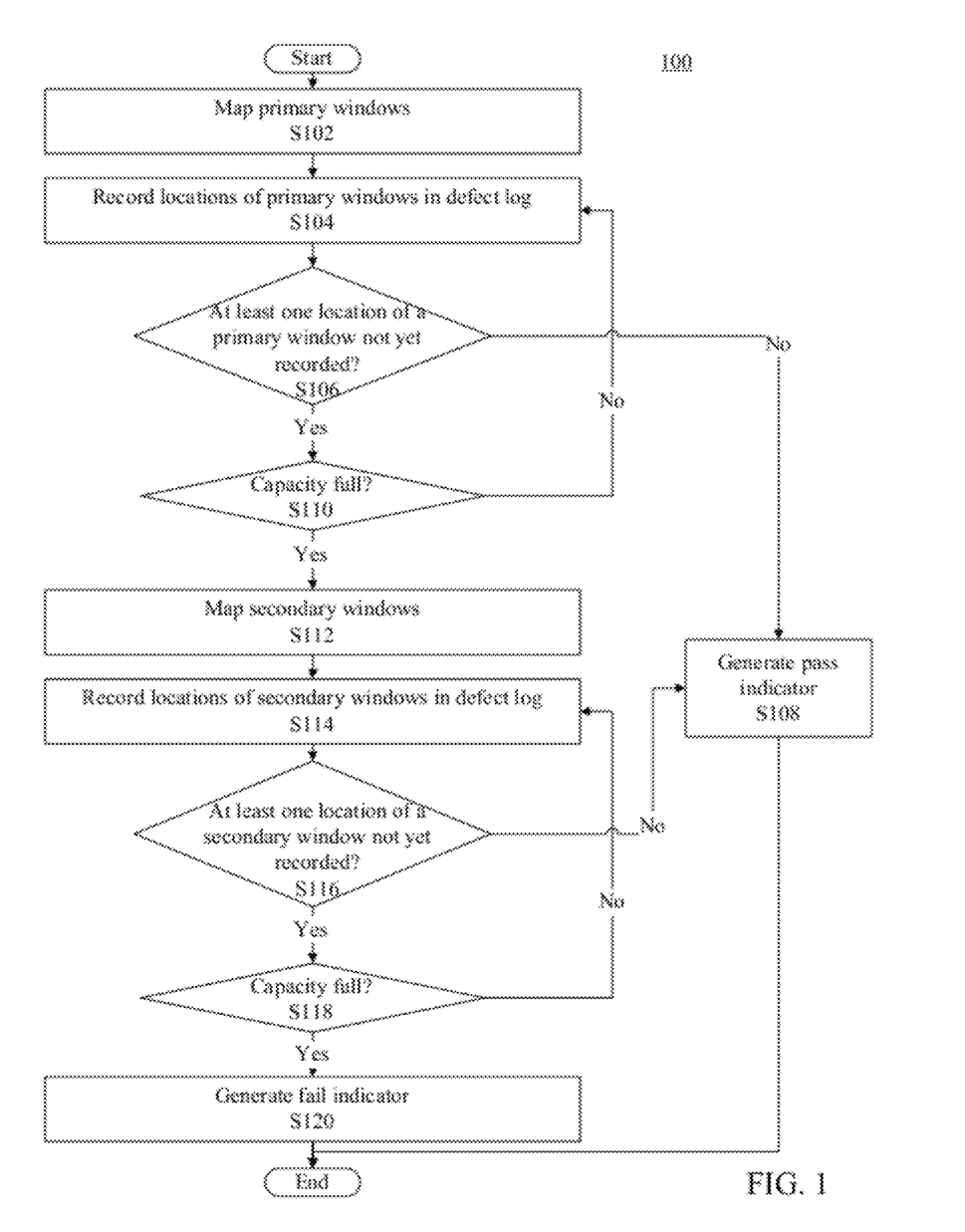
FIG. 1 illustrates a method for recording defects on a hard drive, in accordance with various aspects of the subject technology.

When the location of a window is recorded in the defect log, each track covered by the window is treated as a separate entry. Thus, the size of each window (e.g., specifically the number of tracks covered by the window) dictates how many entries may be stored in the defect log, which can only store a finite number of entries. If the defect log becomes full from recording the locations of the windows, then the disk on which the defect log is stored is considered a failure and not suitable for use. In such a situation, the head corresponding to the disk is typically depopulated, thereby rendering the entire disk unusable despite the fact that the disk may contain remaining data sectors that have not been mapped by the windows but are nevertheless suitable for use. According to various aspects of the subject technology, a method is provided for recording defects on a hard drive such that more entries may be recorded in the defect log to allow a greater portion of the remaining data sectors to be salvaged for use. Method 100, as illustrated in FIG. 1, is an example of such a method.

According to step S102 of method 100, a plurality of primary windows is mapped to cover defects on a disk of a hard drive and their surrounding data sectors. Each primary window contains a respective plurality of data sectors on the disk and at least one defect. In some aspects, the plurality of primary windows is defined based on a first set of parameters. The first set of parameters may specify a size for each primary window, wherein the size of each primary window is identified by a number of tracks and a number of wedges of the disk covered by each primary window. In some aspects, all of the primary windows have the same size as one another. According to step S104, the locations of these primary windows are recorded in a defect log stored on the disk.

Figure 2A:
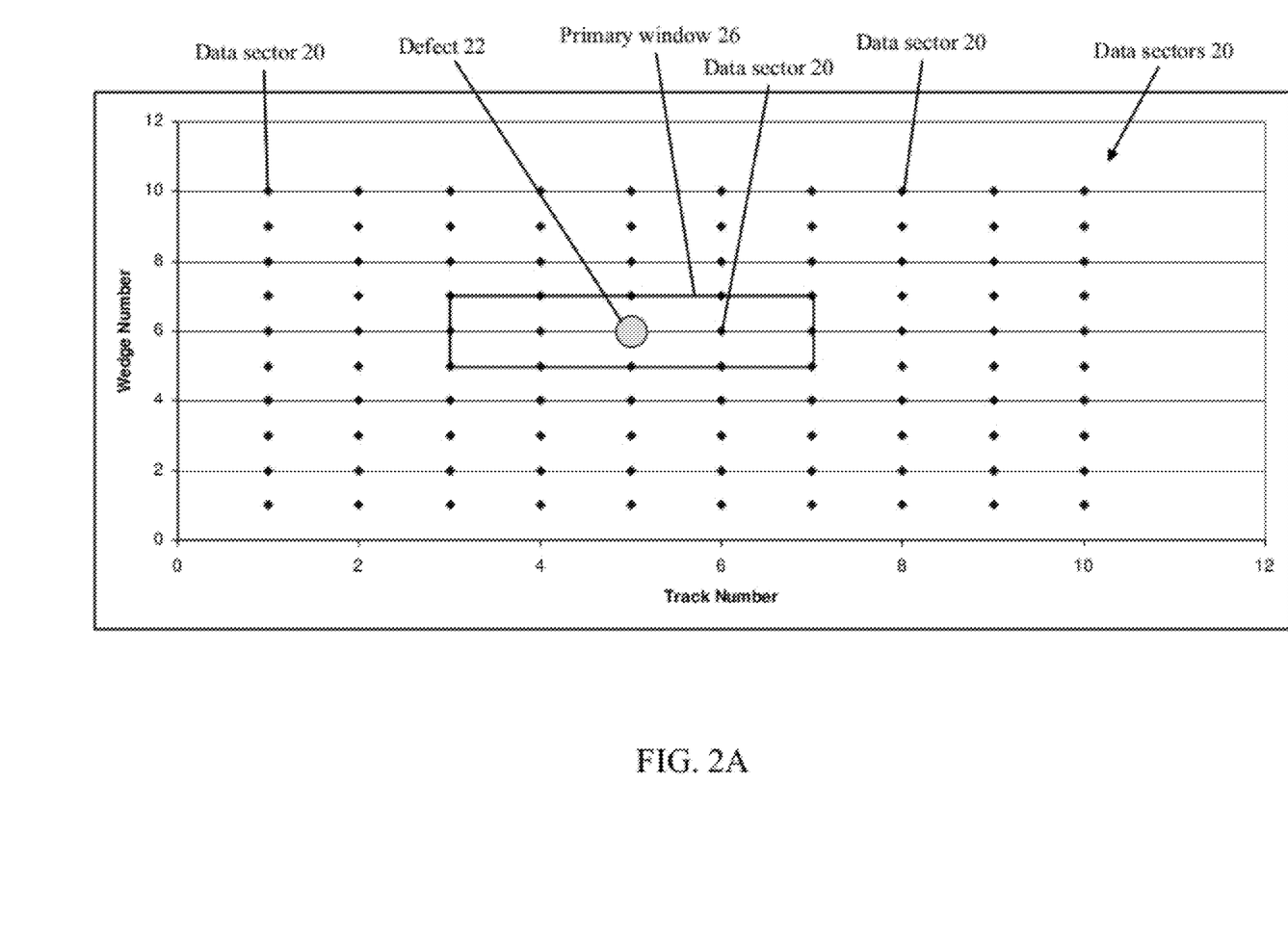
FIGS. 2A and 2B illustrate an example of mapping a defect using a primary window compared to mapping the defect using a secondary window, in accordance with various aspects of the subject technology.

FIG. 2A illustrates a plurality of data sectors 20 on a disk of a hard drive, wherein each data sector 20 is identified by a corresponding track number and a corresponding wedge number. FIG. 2A also illustrates an example of primary window 26 mapping defect 22, in accordance with various aspects of the subject technology. Although primary window 26 is illustrated as a rectangle, primary window 26 may be in the form of other suitable shapes such as an L-shape, a T-shape, a U-shape, or combinations thereof. Although the plurality of data sectors 20 are illustrated from tracks 1 through 10 and from wedges 1 through 10, it is understood that other suitable ranges for the tracks and/or wedges may be used. As an example, the location of primary window 26 may be recorded in a defect log in the following manner:

| Track | Wedge Start | Wedge Stop |
|-------|-------------|------------|
| 3 | 5 | 7 |
| 4 | 5 | 7 |
| 5 | 5 | 7 |
| 6 | 5 | 7 |
| 7 | 5 | 7 |

Thus, the location of primary window 26 is recorded in the defect log using five entries, with each entry corresponding to a different track.

Referring to steps S106 and S108 of FIG. 1, if all of the locations of the primary windows are recorded in the defect log (e.g., all the defects detected on the disk have been scanned and recorded), then a pass indicator is generated, which indicates that the disk is suitable for use. If at least one location of a primary window is not yet recorded and the capacity of the defect log is not full, then the location of another primary window is recorded in the defect log, according to steps S104, S106, and S110. In some aspects, the capacity of the defect log is considered not full if the defect log can support the recording of the location of another window. In some aspects, the capacity of the defect log is considered full if the defect log cannot support the recording of the location of another window.

If recording the locations of the primary windows has failed (e.g., at least one location of a primary window is not yet recorded and the capacity of the defect log is full), the disk of the hard drive is not automatically designated as a failure. This is because the disk may contain remaining data sectors that have not been mapped by the primary windows but are nevertheless suitable for use. Thus, a plurality of secondary windows is used instead of the primary windows to map the defects on the disk and their surrounding data sectors, according to steps S106, S110, and S112. According to certain aspects, by mapping the plurality of secondary windows, more entries may be recorded in the defect log compared to the primary windows to allow a greater portion of the remaining data sectors to be salvaged for use.

According to various aspects of the subject technology, each secondary window contains a respective plurality of data sectors containing at least one defect, and the plurality of secondary windows is defined based on a second set of parameters that specify a size of each secondary window. In some aspects, all of the secondary windows have the same size as one another. In some aspects, the number of data sectors contained in each of the plurality of primary windows is different from the number of data sectors contained in each of the plurality of secondary windows. In some aspects, the plurality of secondary windows may cover less tracks than the plurality of primary windows and/or the plurality of secondary windows may cover more wedges per secondary window than the plurality of primary windows covers per primary window. Thus, less entries may be recorded in the defect log when mapping the defects with the secondary windows as compared to mapping the defects with the primary windows. According to step S114, the locations of the secondary windows are recorded in the defect log stored on the disk. In some aspects, recording the location of each secondary window comprises overwriting at least one recorded location of a primary window in the defect log of the disk.

Figure 2B:
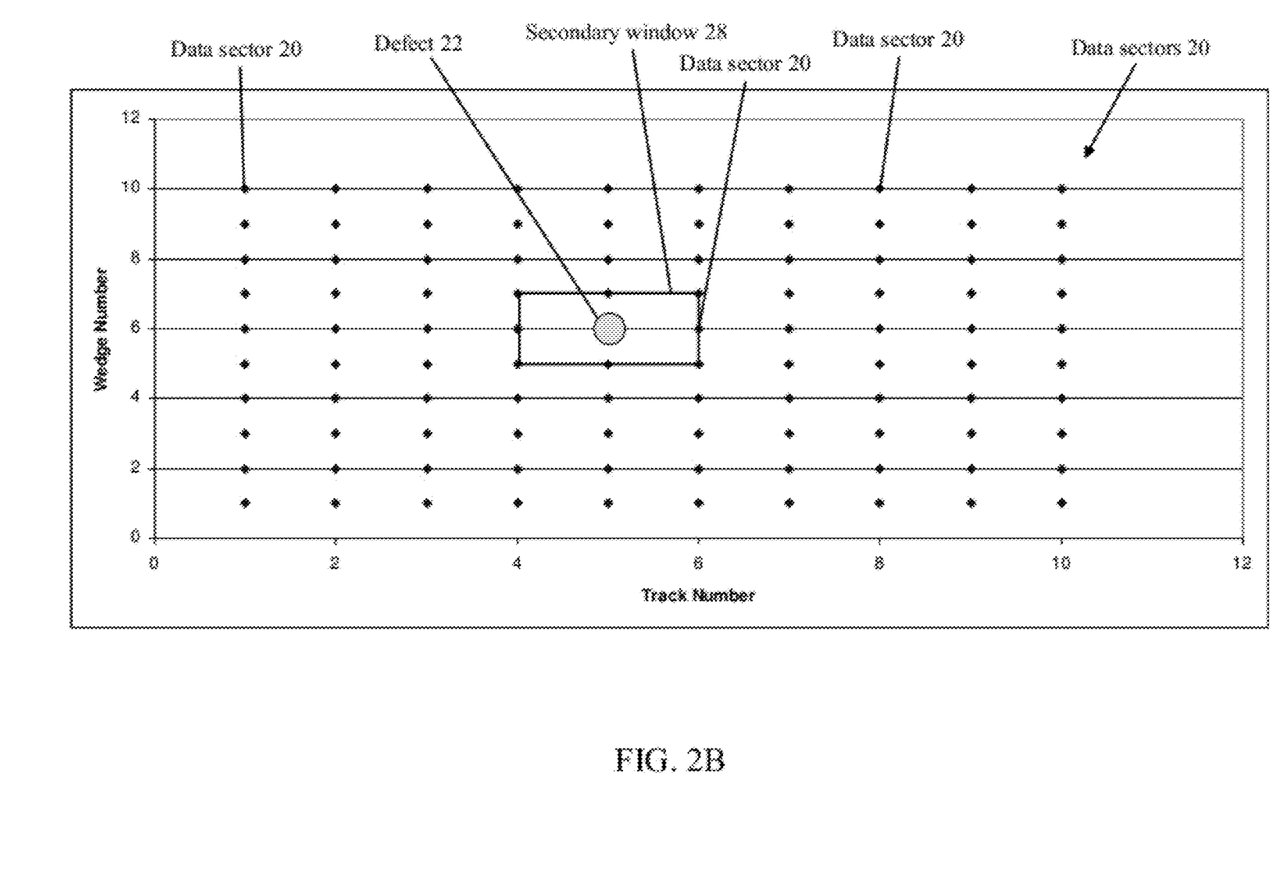

For purposes of illustration, assume that the recording of the location of primary window 26 of FIG. 2A has failed because the location of primary window 26 is not yet recorded but the defect log only has three remaining entries (while recording the location of primary window 26 would use five entries). According to various aspects of the subject technology, a secondary window may be used to map defect 22 such that the location of the secondary window may be recorded in the defect log. FIG. 2B illustrates an example of secondary window 28 used to map defect 22, in accordance with various aspects of the subject technology. Secondary window 28 is sized such that it covers less tracks than primary window 26. Although secondary window 28 is illustrated as a rectangle, secondary window 28 may be in the form of other suitable shapes such as an L-shape, a T-shape, a U-shape, or combinations thereof. The location of secondary window 28 may be recorded in the defect log in the following manner:

| Track | Wedge Start | Wedge Stop |
|-------|-------------|------------|
| 4 | 5 | 7 |
| 5 | 5 | 7 |
| 6 | 5 | 7 |

Because secondary window 28 only covers three entries, the location of secondary window 28 may be recorded in the defect log while the location of primary window 26 cannot. Although only a single primary window and a single secondary window is shown in FIGS. 2A and 2B, a plurality of secondary windows may be used instead of a plurality of primary windows to map defects on the disk of a hard drive. According to certain aspects, if the plurality of secondary windows covers less tracks than the plurality of primary windows, then more entries may be recorded in the defect log using the secondary windows than with using the primary windows.

Referring to steps S116 and S118, if all of the locations of the secondary windows are recorded in the defect log (e.g., all the defects detected on the disk have been scanned and recorded), then the pass indicator is generated, which indicates that the disk is suitable for use. If at least one location of a secondary window is not yet recorded and the capacity of the defect log is not full, then the location of another secondary window is recorded in the defect log, according to steps S114, S116, and S118.

If, on the other hand, recording the locations of the secondary windows has failed (e.g., at least one location of a secondary window is not yet recorded and the capacity of the defect log is full), then a failure indicator may be generated according to steps S116, S118, and S120. The failure indicator may indicate that the disk is not suitable for use. In this situation, the defect log is full despite the fact that secondary windows are used to record the locations of the defects on the disk of the hard drive. Such a situation may indicate that the disk contains too many defects for the disk to be considered suitable for use, and thus the failure indicator generated is appropriate.

Figure 3A:
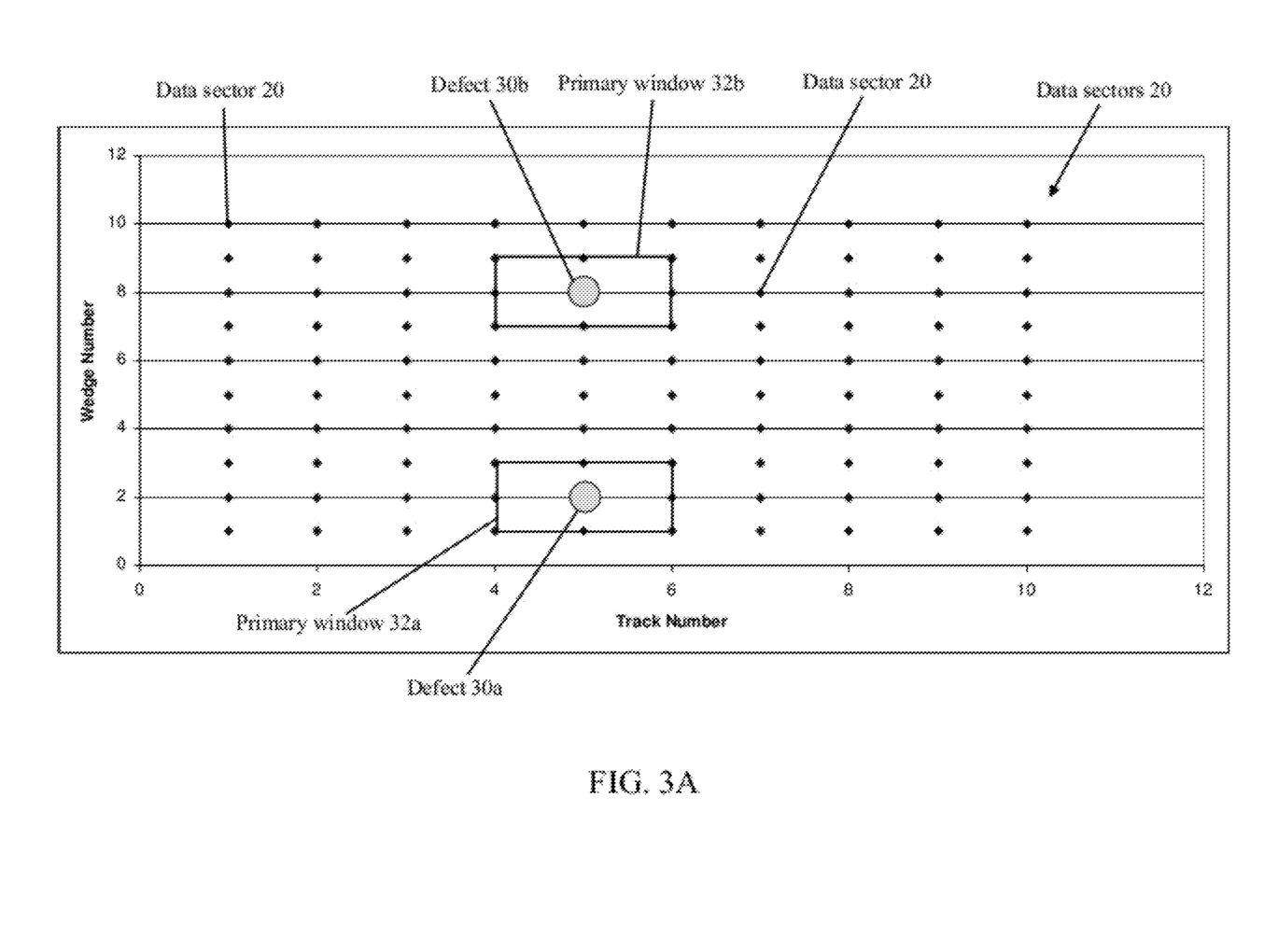
FIGS. 3A and 3B illustrate an example of mapping defects using primary windows compared to mapping the defects using a secondary window, in accordance with various aspects of the subject technology.
Figure 3B:
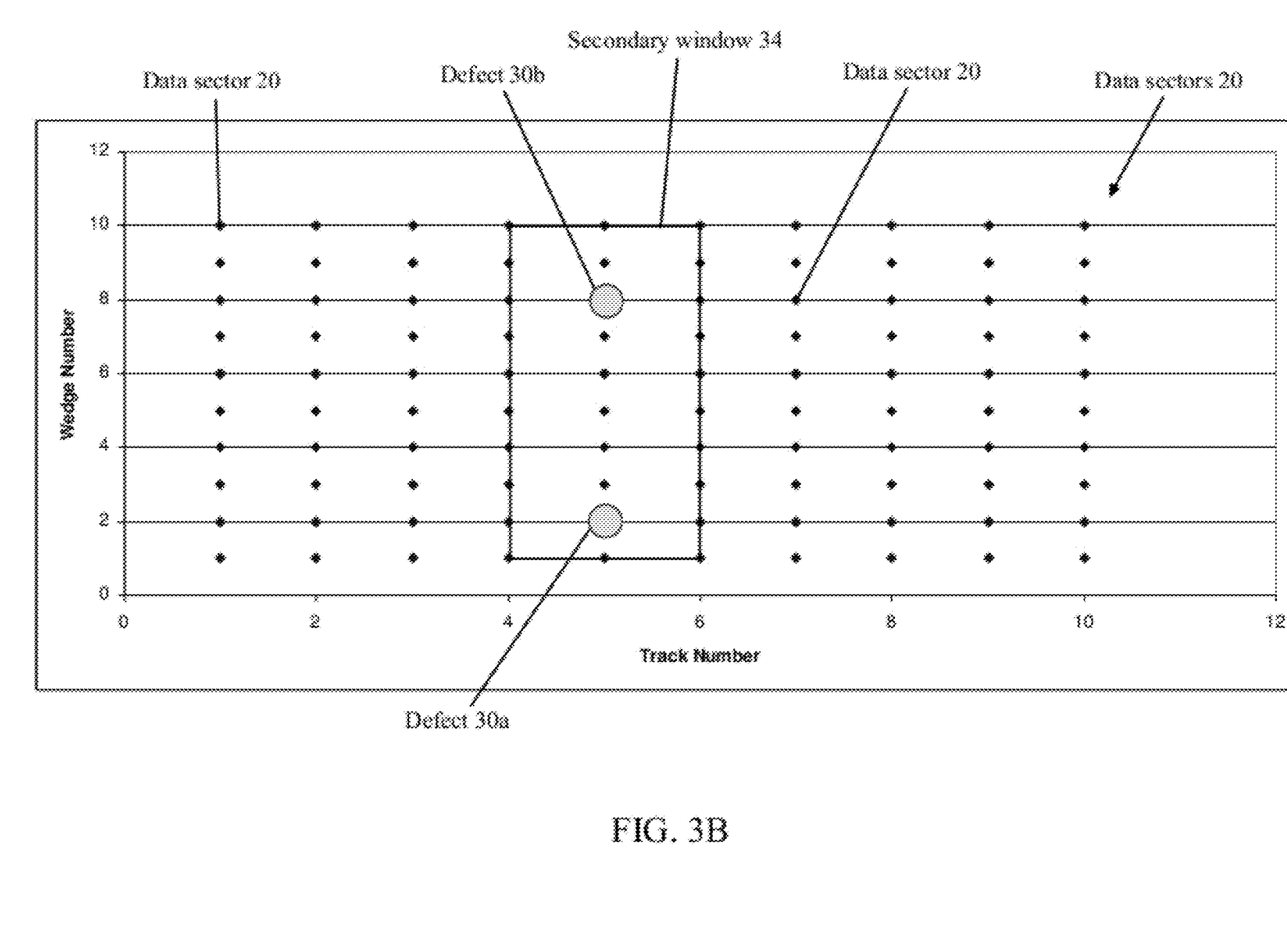

FIGS. 3A and 3B illustrate an example of mapping defects 30a and 30b using primary windows 32a and 32b compared to mapping defects 30a and 30b using secondary window 34, in accordance with various aspects of the subject technology. As shown in FIG. 3A, primary window 32a is used to map defect 30a, while a separate primary window 32b is used to map defect 30b. The location of primary window 32a may be recorded in a defect log in the following manner:

| Track | Wedge Start | Wedge Stop |
|---|---|---|
| 4 | 1 | 3 |
| 5 | 1 | 3 |
| 6 | 1 | 3 |

The location of primary window 32b may be recorded in the defect log in the following manner:

| Track | Wedge Start | Wedge Stop |
|---|---|---|
| 4 | 7 | 9 |
| 5 | 7 | 9 |
| 6 | 7 | 9 |

Thus, the locations of primary windows 32a and 32b are recorded in the defect log using a total of six entries, with each entry corresponding to a different track per window. In contrast, as shown in FIG. 3B, a single secondary window 34 is used to map both defects 30a and 30b. The location of secondary window 34 may be recorded in the defect log in the following manner:

| Track | Wedge Start | Wedge Stop |
|---|---|---|
| 4 | 1 | 10 |
| 5 | 1 | 10 |
| 6 | 1 | 10 |

Thus, the location of secondary window 34 is recorded in the defect log using only three entries compared to the six entries used by primary windows 32a and 32b. Although secondary window 34 covers more wedges than the primary windows 32a and 32b cover, less entries are used to record the location of secondary window 34 compared to recording the locations of primary windows 32a and 32b. Thus, according to certain aspects, while primary windows 32a and 32b contain less data sectors than secondary window 34, the savings of an additional three entries in the defect log may allow more data sectors to be salvaged when using secondary window 34.

Figure 4A:
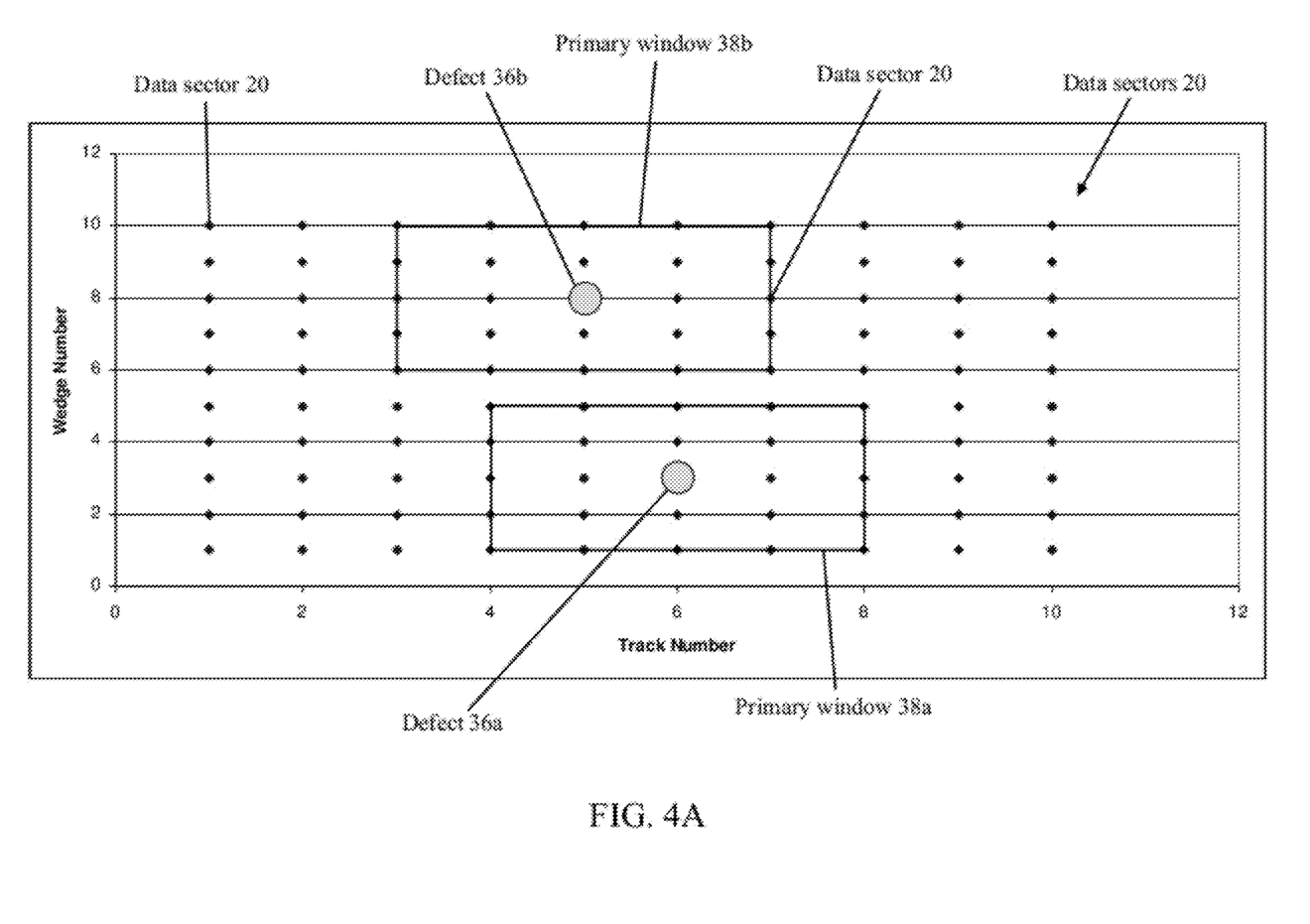
FIGS. 4A and 4B illustrate an example of mapping defects using primary windows compared to mapping the defects using a secondary window, in accordance with various aspects of the subject technology.
Figure 4B:
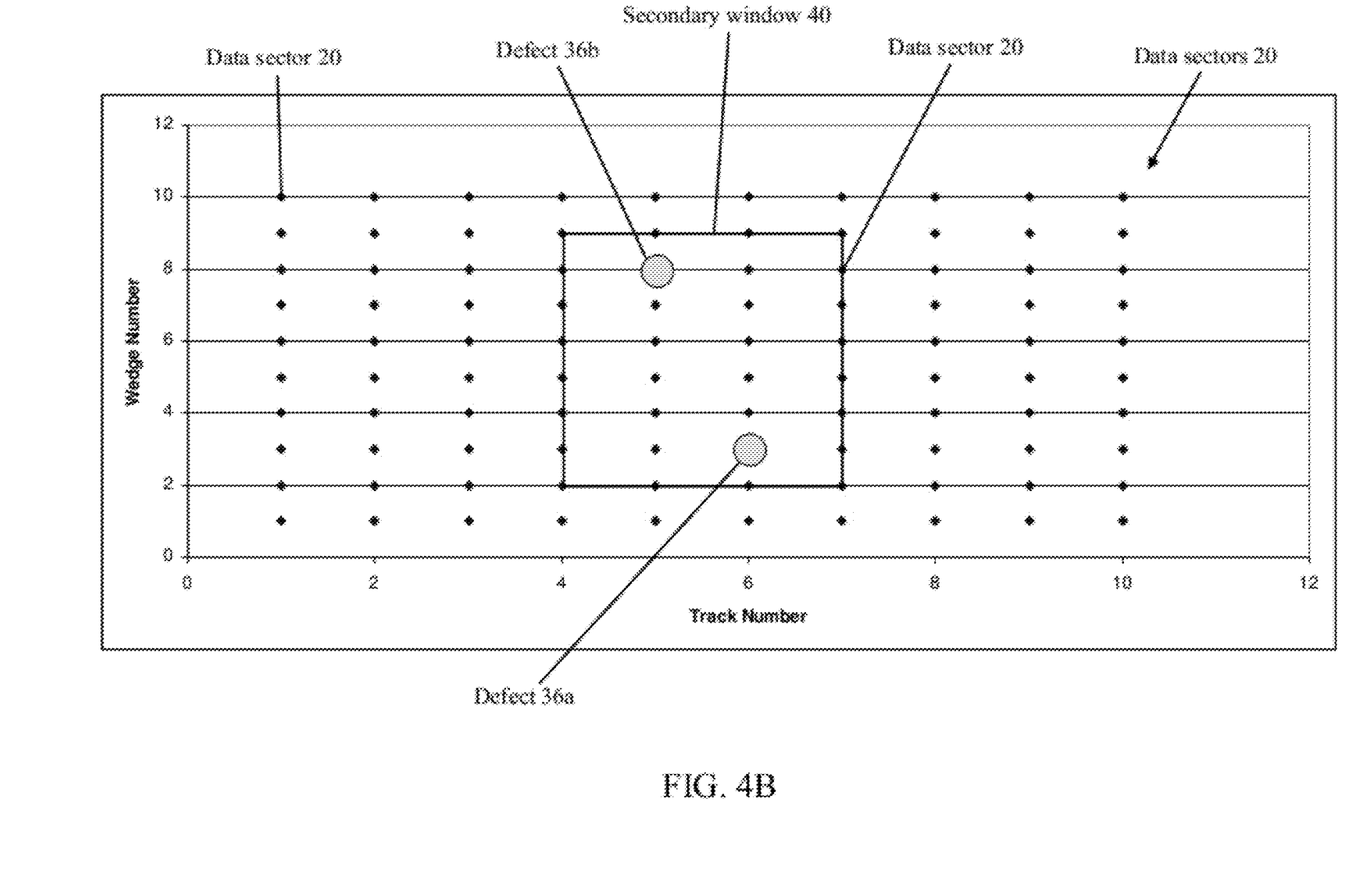

FIGS. 4A and 4B illustrate an example of mapping defects 36a and 36b using primary windows 38a and 38b compared to mapping defects 36a and 36b using secondary window 40, in accordance with various aspects of the subject technology. As shown in FIG. 4A, primary window 38a is used to map defect 36a, while a separate primary window 38b is used to map defect 36b. The location of primary window 38a may be recorded in a defect log in the following manner:

| Track | Wedge Start | Wedge Stop |
|---|---|---|
| 4 | 1 | 5 |
| 5 | 1 | 5 |
| 6 | 1 | 5 |
| 7 | 1 | 5 |
| 8 | 1 | 5 |

The location of primary window 38b may be recorded in the defect log in the following manner:

| Track | Wedge Start | Wedge Stop |
|---|---|---|
| 3 | 6 | 10 |
| 4 | 6 | 10 |
| 5 | 6 | 10 |
| 6 | 6 | 10 |
| 7 | 6 | 10 |

Thus, the locations of primary windows 38a and 38b are recorded in the defect log using a total of ten entries, with each entry corresponding to a different track per window. In contrast, as shown in FIG. 4B, a single secondary window 40 is used to map both defects 36a and 36b. The location of secondary window 40 may be recorded in the defect log in the following manner:

| Track | Wedge Start | Wedge Stop |
|---|---|---|
| 4 | 2 | 9 |
| 5 | 2 | 9 |
| 6 | 2 | 9 |
| 7 | 2 | 9 |

Thus, the location of secondary window 40 is recorded in the defect log using only four entries compared to the ten entries used by primary windows 38a and 38b. Secondary window 40 covers less tracks than the primary windows 38a and 38b. Furthermore, although secondary window 40 covers more wedges than each of primary windows 38a and 38b, secondary window 40 covers less wedges than primary windows 38a and 38b combined. Thus, secondary window 40 contains less data sectors than primary windows 38a and 38b contain, and also use less entries when recorded in the defect log.

Figure 5:
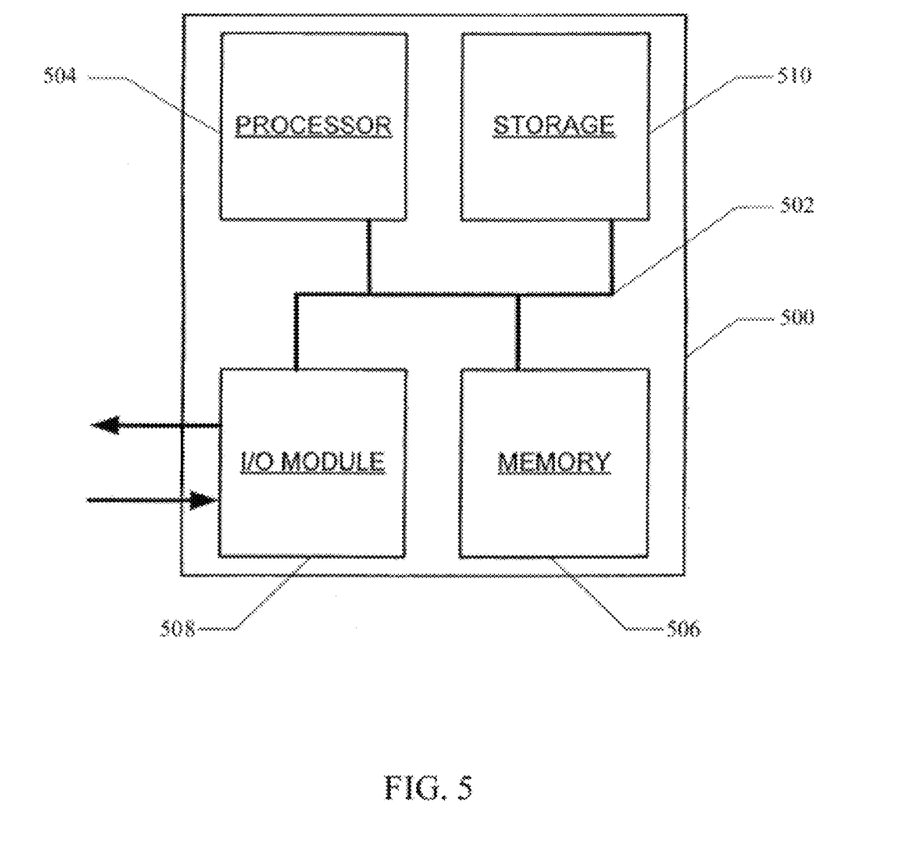
FIG. 5 is a block diagram illustrating components of a controller, in accordance with various aspects of the subject technology.

FIG. 5 is a block diagram illustrating components of controller 500, in accordance with various aspects of the subject technology. Controller 500 comprises processor module 504, storage module 510, input/output (I/O) module 508, memory module 506, and bus 502. Bus 502 may be any suitable communication mechanism for communicating information. Processor module 504, storage module 510, I/O module 508, and memory module 506 are coupled with bus 502 for communicating information between any of the modules of controller 500 and/or information between any module of controller 500 and a device external to controller 500. For example, information communicated between any of the modules of controller 500 may include instructions and/or data. In some aspects, bus 502 may be a universal serial bus. In some aspects, bus 502 may provide Ethernet connectivity.

In some aspects, processor module 504 may comprise one or more processors, where each processor may perform different functions or execute different instructions and/or processes. For example, one or more processors may execute instructions for recording defects on a hard drive as described herein (e.g., method 100), and one or more processors may execute instructions for input/output functions.

Memory module 506 may be random access memory ("RAM") or other dynamic storage devices for storing information and instructions to be executed by processor module 504. Memory module 506 may also be used for storing temporary variables or other intermediate information during execution of instructions by processor 504. In some aspects, memory module 506 may comprise battery-powered static RAM, which stores information without requiring power to maintain the stored information. Storage module 510 may be a magnetic disk or optical disk and may also store information and instructions. In some aspects, storage module 510 may comprise hard disk storage or electronic memory storage (e.g., flash memory). In some aspects, memory module 506 and storage module 510 are both a machine-readable medium.

Controller 500 is coupled via I/O module 508 to a user interface for providing information to and receiving information from an operator implementing method 100 (e.g., to test a hard drive during its manufacture). For example, the user interface may be a cathode ray tube ("CRT") or LCD monitor for displaying information to an operator. The user interface may also include, for example, a keyboard or a mouse coupled to controller 500 via I/O module 508 for communicating information and command selections to processor module 504.

According to various aspects of the subject disclosure, methods described herein are executed by controller 500. Specifically, processor module 504 executes one or more sequences of instructions contained in memory module 506 and/or storage module 510. In one example, instructions may be read into memory module 506 from another machine-readable medium, such as storage module 510. In another example, instructions may be read directly into memory module 506 from I/O module 508, for example from an operator implementing method 100 via the user interface. Execution of the sequences of instructions contained in memory module 506 and/or storage module 510 causes processor module 504 to perform methods to record defects on hard drives (e.g., method 100). For example, a computational algorithm for recording defects on a hard drive may be stored in memory module 506 and/or storage module 510 as one or more sequences of instructions. Information such as the location of each primary window and/or secondary window, the first set of parameters, the size of each primary window, the second set of parameters, the size of each secondary window, the capacity of the defect log, the pass indicator, and/or the fail indicator may be communicated from processor module 504 to memory module 506 and/or storage module 510 via bus 502 for storage. In some aspects, the information may be communicated from processor module 504, memory module 506, and/or storage module 510 to I/O module 508 via bus 502. The information may then be communicated from I/O module 508 to an operator implementing method 100 via the user interface.

One or more processors in a multi-processing arrangement may also be employed to execute the sequences of instructions contained in memory module 506 and/or storage module 510. In some aspects, hard-wired circuitry may be used in place of or in combination with software instructions to implement various aspects of the subject disclosure. Thus, aspects of the subject disclosure are not limited to any specific combination of hardware circuitry and software.

The term "machine-readable medium," or "computer-readable medium," as used herein, refers to any medium that participates in providing instructions to processor module 504 for execution. Such a medium may take many forms, including, but not limited to, non-volatile media, volatile media, and transmission media. Non-volatile media include, for example, optical or magnetic disks, such as storage module 510. Volatile media include dynamic memory, such as memory module 506. Common forms of machine-readable media or computer-readable media include, for example, floppy disk, a flexible disk, hard disk, magnetic tape, any other magnetic medium, a CD-ROM, DVD, any other optical medium, punch cards, paper tape, any other physical mediums with patterns of holes, a RAM, a PROM, an EPROM, a FLASH EPROM, any other memory chip or cartridge, or any other medium from which a processor can read.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A method for recording defects on a hard drive, the method comprising:
 mapping a plurality of primary windows, each primary window containing a respective plurality of data sectors on a disk of a hard drive, each of the respective plurality of data sectors containing at least one defect;

recording locations for individual primary windows of the plurality of primary windows in a defect log of the disk until a location for each primary window of the plurality of primary windows has been recorded in the defect log or until a capacity of the defect log is full;

mapping a plurality of secondary windows if the capacity of the defect log is full and at least one location of a primary window of the plurality of primary windows is not yet recorded in the defect log, each secondary window containing a respective plurality of data sectors containing at least one defect, wherein the number of data sectors contained in each of the plurality of primary windows is different from the number of data sectors contained in each of the plurality of secondary windows; and recording locations for individual secondary windows of the plurality of secondary windows in the defect log of the disk.

2. The method of claim 1, wherein the plurality of primary windows is defined based on a first set of parameters, the first set of parameters specifying a size of each primary window of the plurality of primary windows, the size of each primary window identified by a number of tracks and a number of wedges of the disk.

3. The method of claim 2, wherein all of the primary windows of the plurality of primary windows have the same size as one another.

4. The method of claim 2, wherein the plurality of secondary windows is defined based on a second set of parameters, the second set of parameters specifying a size of each secondary window of the plurality of secondary windows, the size of each secondary window identified by a number of tracks and a number of wedges of the disk.

5. The method of claim 4, wherein all of the secondary windows of the plurality of secondary windows have the same size as one another.

6. The method of claim 4, wherein the plurality of secondary windows covers less tracks than the plurality of primary windows and/or the plurality of secondary windows covers more wedges per secondary window than the plurality of primary windows covers per primary window.

7. The method of claim 4, wherein the plurality of secondary windows covers less tracks than the plurality of primary windows.

8. The method of claim 4, wherein the plurality of secondary windows covers more wedges per secondary window than the plurality of primary windows covers per primary window.

9. The method of claim 1, further comprising generating a failure indicator if recording the location of each secondary window fails.

10. The method of claim 9, wherein recording the location of each secondary window fails if a capacity of the defect log is full and at least one location of a secondary window of the plurality of secondary windows is not yet recorded in the defect log.

11. The method of claim 1, wherein recording the location of each secondary window comprises overwriting at least one recorded location of a primary window in the defect log of the disk.

12. A machine-readable non-transitory medium encoded with executable instructions for recording defects on a hard drive, the instructions comprising code for:

mapping a plurality of primary windows, each primary window containing a respective plurality of data sectors on a disk of a hard drive, each of the respective plurality of data sectors containing at least one defect;

recording locations for individual primary windows of the plurality of primary windows in a defect log of the disk until a location for each primary window of the plurality of primary windows has been recorded in the defect log or until a capacity of the defect log is full;

mapping a plurality of secondary windows if the capacity of the defect log is full and at least one location of a primary window of the plurality of primary windows is not yet recorded in the defect log, each secondary window containing a respective plurality of data sectors containing at least one defect, wherein the number of data sectors contained in each of the plurality of primary windows is different from the number of data sectors contained in each of the plurality of secondary windows; and recording locations for individual secondary windows of the plurality of secondary windows in the defect log of the disk.

13. The machine-readable non-transitory medium of claim 12, further comprising generating a failure indicator if recording the location of each secondary window fails.

14. The machine-readable non-transitory medium of claim 13, wherein recording the location of each secondary window fails if a capacity of the defect log is full and at least one location of a secondary window of the plurality of secondary windows is not yet recorded in the defect log.

15. A controller for recording defects on a hard drive, the controller comprising:

a memory module containing executable instructions; and a processor configured to execute the instructions to perform a method for:

mapping a plurality of primary windows, each primary window containing a respective plurality of data sectors on a disk of a hard drive, each of the respective plurality of data sectors containing at least one defect;

recording locations for individual primary windows of the plurality of primary windows in a defect log of the disk until a location for each primary window of the plurality of primary windows has been recorded in the defect log or until a capacity of the defect log is full;

mapping a plurality of secondary windows if the capacity of the defect log is full and at least one location of a primary window of the plurality of primary windows is not yet recorded in the defect log, each secondary window containing a respective plurality of data sectors containing at least one defect, wherein the number of data sectors contained in each of the plurality of primary windows is different from the number of data sectors contained in each of the plurality of secondary windows; and recording locations for individual secondary windows of the plurality of secondary windows in the defect log of the disk.

16. The controller of claim 15, further comprising generating a failure indicator if recording the location of each secondary window fails.

17. The controller of claim 16, wherein recording the location of each secondary window fails if a capacity of the defect log is full and at least one location of a secondary window of the plurality of secondary windows is not yet recorded in the defect log.

* * * * *